United States Patent
Wazne et al.

(10) Patent No.: US 7,452,163 B2
(45) Date of Patent: Nov. 18, 2008

(54) METHOD OF TREATMENT, STABILIZATION AND HEAVE CONTROL FOR CHROMITE ORE PROCESSING RESIDUES (COPR) AND CHROMIUM CONTAMINATED SOILS

(75) Inventors: Mahmoud Wazne, New York, NY (US); Dimitris Dermatas, Hoboken, NJ (US); Dilhan M. Kalyon, Teaneck, NJ (US); Xiaoguang Meng, Highland Park, NJ (US); Maria Kaouris, Basking Ridge, NJ (US); John J. Morris, Oakland, NJ (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 11/395,453

(22) Filed: Mar. 31, 2006

(65) Prior Publication Data

US 2007/0088188 A1 Apr. 19, 2007

Related U.S. Application Data

(60) Provisional application No. 60/666,802, filed on Mar. 31, 2005.

(51) Int. Cl.
*E02D 3/12* (2006.01)
(52) U.S. Cl. .................................... 405/263
(58) Field of Classification Search ................. 405/263
See application file for complete search history.

(56) References Cited

U.S. PATENT DOCUMENTS

| | | | |
|---|---|---|---|
| 3,294,680 A | 12/1966 | Lancy | |
| 3,679,557 A | 7/1972 | Gilby et al. | |
| 3,784,669 A | 1/1974 | Elges et al. | |
| 3,937,785 A | 2/1976 | Gancy et al. | |
| 3,969,246 A | 7/1976 | Feltz et al. | |
| 3,981,965 A | 9/1976 | Gancy et al. | |
| 4,504,321 A | 3/1985 | Kapland et al. | |
| 5,122,012 A * | 6/1992 | Walker, Jr. | 405/263 |
| 5,202,033 A | 4/1993 | Stanforth et al. | |

(Continued)

FOREIGN PATENT DOCUMENTS

DE 43 19 974 A1 12/1994

(Continued)

OTHER PUBLICATIONS

International Search Report and Written Opinion of International Searching Authority issued in related International Patent Application No. PCT/US06/012662.

(Continued)

*Primary Examiner*—John Kreck
(74) *Attorney, Agent, or Firm*—Greenberg Traurig, LLP

(57) ABSTRACT

A process for stabilizing chromium in a chromite ore processing residue (COPR) comprises the steps of adding an acid to consume the excess alkalinity of the COPR, resulting in a pH of less than 10; and adding a chemical reductant to the COPR to convert any hexavalent chromium present to trivalent chromium. A source of sulfate may be added to the COPR to reduce heave potential and improve its geotechnical stability. Treated COPR may be encapsulated in a material suitable to prevent contact between the COPR and water, such as an asphalt.

10 Claims, 5 Drawing Sheets

U.S. PATENT DOCUMENTS

| | | | |
|---|---|---|---|
| 5,228,808 A * | 7/1993 | McKennon et al. | 405/263 |
| 5,285,000 A | 2/1994 | Schwitzgebel | |
| 5,304,710 A * | 4/1994 | Kigel et al. | 405/128.75 |
| 5,397,478 A | 3/1995 | Pal et al. | |
| 5,562,588 A | 10/1996 | Higgins | |
| 5,967,965 A | 10/1999 | Vyshkina et al. | |
| 6,221,002 B1 | 4/2001 | James | |
| 2003/0073877 A1 * | 4/2003 | Yen | 588/236 |
| 2004/0086438 A1 | 5/2004 | Sreeram et al. | |
| 2004/0126189 A1 | 7/2004 | Chowdhury | |

FOREIGN PATENT DOCUMENTS

| | | |
|---|---|---|
| GB | 2 238 258 A | 5/1990 |
| WO | WO 03/022744 A2 | 3/2003 |

OTHER PUBLICATIONS

ASTM Standard D 4546-90, Standard Test Methods for One-Dimensional Swell or Settlement Potential of Cohesive Soils. 1990. American Society for Testing and Materials.

ASTM D 3877-80, Standard Test Methods for One-Dimensional Expansion, Shrinkage and Uplift Pressure of Soil-Lime Mixtures. 1980. American Society for Testing and Materials.

S. Wild, et al., Suppression of swelling associated with ettringite formation in lime stabilized sulphate bearing clar soils by partial substitution of lime with ground granulated blast furnace slag. Engineering Geology 51. 1999. pp. 257-277. Elsevier Science B.V.

D. Dermatas, Ettringite-induced swelling in soils: State-of-the-art. Appl. Mech. Rev., vol. 48, No. 10 Oct. 1995. pp. 659-673.

International Preliminary Report on Patentability for International (PCT) Application No. PCT/US2006/012662, mailed Oct. 11, 2007.

* cited by examiner

METHOD OF TREATMENT, STABILIZATION AND HEAVE CONTROL FOR CHROMITE ORE PROCESSING RESIDUES (COPR) AND CHROMIUM CONTAMINATED SOILS

CROSS-REFERENCE TO RELATED APPLICATION

This application claims the benefit of U.S. Provisional Patent Application No. 60/666,802, which was filed on Mar. 31, 2005, which is incorporated by reference herein in its entirety.

FIELD OF THE INVENTION

The present invention relates to the chemical and geotechnical stabilization of soils, mineral processing residues and similar materials. More particularly, the present invention relates to the chemical and geotechnical stabilization of chromite ore processing residue (COPR) and soils contaminated with chromium.

BACKGROUND OF THE INVENTION

COPR is produced during the process of extracting chromium (i.e., chromite ($Cr_2O_3$)) from its ore. The extraction process involves roasting the chromite ore to oxidize the chromium therein from the trivalent to the hexavalent state, then treating the oxidized chromium with soda ash (i.e., $Na_2CO_3$) to form sodium chromate ($Na_2CrO_4$). The principal reaction may be described as follows:

$$Cr_2O_3 + Na_2CO_3 + 1.5\ O_2 \rightarrow 2Na_2CrO_4 + CO2$$

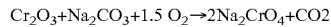

Lime (i.e., CaO) is added during the roasting process to act as a mechanical separator, allowing air circulation within the ore and thereby promoting the reaction of oxygen with chromite and sodium carbonate. Lime also serves as a sequestering agent; combining with various impurities present in the ore to form insoluble complexes. The sodium chromate formed during the roasting process is then extracted with hot water as weakly-colored yellow liquor. The sodium chromate is then converted into sodium dichromate ($Na_2Cr_2O_7$) by reaction with sulfuric acid. After draining, the residue is discarded. The disposed COPR contains unreacted chromite ore and residual chromate, and has a high alkalinity due to the soda ash and lime used in the roasting process.

COPR was used as fill material at various locations in the United States, but was discovered to not be as benign as initially thought. In particular, yellow chromate solution was observed to leach from locations where COPR had been deposited, and structures built on sites where COPR had been used as fill experienced catastrophic failures due to the heaving and uncontrolled expansion of the COPR material.

In the environment, chromium exists mainly in two oxidation states: hexavalent chromium (Cr(VI)) and trivalent chromium (Cr(III)). Hexavalent chromium is highly mobile, acutely toxic at moderate doses, and classified as a known respiratory carcinogen in humans. In contrast, trivalent chromium is a dietary element, not classified as a carcinogen, and is immobile in most environmental settings. Most of the known stabilization methods involve the chemical reduction of hexavalent chromium (i.e, Cr(VI)) to trivalent chromium (i.e., Cr(III)) concurrent with pH adjustment. The reductants typically used include elemental iron, pyrite, ferrous compounds, organic compounds, and sulfide compounds.

In response to the known toxicity of hexavalent chromium, the United States Environmental Protection Agency ("USEPA") has set a target level for chromium in leachate of 5 mg/L for in situ treatment of matrices contaminated with chromium, as determined by the Toxicity Characteristic Leaching Procedure ("TCLP"; USEPA Method 1311, Test Methods for Evaluating Solid Waste, Physical/Chemical Methods, EPA Publication SW-486). The USEPA has also set a maximum leachate concentration of 0.6 mg/L (as determined by the TCLP method) for wastes that are to be identified as non-hazardous under the Resource Conservation and Recovery Act ("RCRA") and thus suitable for disposal in "non-hazardous" (Subtitle D) landfills.

The leaching of chromate from a chromium-contaminated matrix can be substantially decreased through stabilization. Chemical stabilization of COPR is inhibited by the high alkaline content of the COPR matrix and the slow release of chromium and alkalinity from the COPR minerals. Geotechnical stabilization is inhibited by the potential swelling of the COPR matrix, before or after treatment, as it releases alkalinity.

A survey of the state of the art of COPR remediation revealed that present practices are generally unsuccessful at achieving the USEPA target levels; or that they can achieve such target levels, but at prohibitively high costs; or that they have severely limited applicability in the field. U.S. Patent Publication No. U.S. 2004/0126189 A1 discloses a process of (1) generating a solution of ferrous sulfate and sulfuric acid by oxidation of iron pyrite, then (2) percolating the acidic solution through a column of COPR to reduce hexavalent chromium to trivalent chromium, while (3) oxidizing the dissolved iron to its ferric state. However, to effectively treat the lower portions of the COPR column, it would be necessary to consume the entire alkalinity of the COPR material, in the upper portions of the column requiring that the quantities of the acidic solution added to the upper portions of the column be far greater than is needed to neutralize the alkalinity present. It is also noteworthy that the ferrous or ferric ions would precipitate from solution as iron hydroxides in zones of high alkalinity. Not only would such precipitation consume the dissolved iron, but the precipitate would inhibit the flow of the acidic solution into those zones. Further, the acidic ferrous solution would flow preferentially through certain pathways in the column, with the result that materials outside of such pathways would remain untreated.

U.S. Pat. No. 5,202,033 discloses an in situ method of treating soil or solid waste contaminated with chromium, by introducing a solution of ferrous sulfate and a substance for use in pH control. This method would present the same difficulties as were discussed above with regard to U.S. Patent Publication No. U.S. 2004/0126189 A1.

U.S. Pat. No. 5,304,710 discloses an ex situ process in which ferrous sulfate is used to chemically stabilize COPR. In this process, the COPR matrix is conditioned by reducing its particle size to 100 mesh, and acidifying it to a pH of 3. Ferrous sulfate is then added to reduce hexavalent chromium to its trivalent state. Finally, the pH of the COPR material is raised by the addition of lime to precipitate and immobilize the freshly formed trivalent chromium. An inherent weakness in this treatment scheme is that it consumes amounts of acid, ferrous sulfate and lime that are far in excess of the theoretical quantities needed to condition the COPR, reduce the hexavalent chromium and stabilize its trivalent form.

Other references disclose the use of solidifying agents to further improve the effectiveness of the chemical stabilization achieved by treatment with ferrous sulfate. U.S. Pat. No. 5,285,000 discloses the use of sodium silicate gel to form a relatively impermeable matrix for chromium-contaminated soil that had been treated with ferrous sulfate. However, this treatment was not tested with COPR, which is more recalcitrant than a soil matrix.

U.S. Pat. No. 5,397,478 describes the use of phosphates as bonding agents after treating chromium in solid wastes using any of a variety of reductants. Examples are provided for the use of sodium dithionate, and include TCLP data from samples that had been cured for a few hours. The reference does not address the long-term stability of the treated wastes.

U.S. Pat. No. 3,981,965 discloses the use of calcium sulfide and sodium hydrosulfide to reduce chromate in chrome waste residue. The effectiveness of the disclosed treatment method was evaluated by the passive method of exposing a pile of treated material to natural precipitation, and collecting the runoff from the pile for analysis. Such a test method does not meet the standards of aggressive testing (e.g., the TCLP protocol) that are now required by the USEPA, and, therefore, cannot be relied upon as evidence that the disclosed treatment method is effective to achieve the target levels that are currently applied.

Other methods of stabilization include mixing blast furnace slag with mud or sludge to prevent leaching of chromium from COPR. For instance, U.S. Pat. No. 4,504,321 discloses that mixing COPR with finely ground granulated blast furnace slag and mud or sludge dredged from various water environments will reduce hexavalent chromium to its trivalent state and form a highly impermeable matrix suitable as stable load-bearing landfill material.

U.S. Pat. No. 6,221,002 discloses the use of ascorbic, acetic, or citric acids for the remediation of chromate bound in COPR material. However, such acids may form aqueous complexes with trivalent chromium, causing the treated material to fail the TCLP test.

U.S. Pat. No. 5,562,588 discloses that mixing the COPR matrix with organic material containing bacteria and nutrients is effective as an in situ treatment for COPR. However, high concentrations of chromium in the leachate liquor will be toxic to the microbial consortia, confining the effectiveness of this treatment method to soils or mineral matrices having lower concentrations of chromate.

U.S. Patent Publication No. 2004/0086438 A1 discloses a method of recovering salts of hexavalent chromium by heating COPR to 350° C. with metal hydroxide, then leaching the chromate thus formed in hot water. Iron salts are recovered by treating the residue with hot mineral acid, followed by addition of a base. This is an energy intensive process, and it does not address the swelling of the treated residues after treatment.

U.S. Pat. No. 5,967,965 discloses the removal of hexavalent chromium from contaminated soil by successive soil washing steps using solutions of anionic or cationic synthetic organic flocculants. The chromium in the recovered floc is chemically reduced, and treated to promote the alkaline formation of insoluble metal hydroxides.

Previous attempts to chemically stabilize the COPR matrix, such as those processes disclosed in the references discussed above, have been only temporarily effective in inhibiting chromate leaching to concentrations below regulatory levels. Factors contributing to the eventual failure of such processes include the back-conversion of trivalent chromium to hexavalent chromium, and the propensity of the COPR material to swell, thus disrupting the treated matrix. An exhaustive investigation and evaluation of commercially available soil treatment technologies showed that none of the known methods addresses the critical issues related to long term treatment performance. It should also be noted that present practices of acid application to reduce the alkalinity and high pH of the COPR may not be effective in the field. Further, the infeasibility of applying strong acids, as currently practiced, is exacerbated by the strongly exothermic nature of their reaction with the alkaline COPR.

None of the technologies that were reviewed address the swelling of the COPR material before or after treatment, which is the cause of heaving, or the mechanisms that are responsible for the production of the minerals responsible for such swelling. Moreover, exhaustive literature searches and review did not yield any information on mechanisms of chromate leaching or on the long-term release of chromate from the COPR matrix. The investigations underlying the present invention have identified potential mechanisms of chromate release, and of the formation of swell-inducing minerals, allowing the development of effective treatments for long-term control of chromium release and expansion of the COPR matrix.

DETAILED DESCRIPTION OF THE INVENTION

Figure 1:
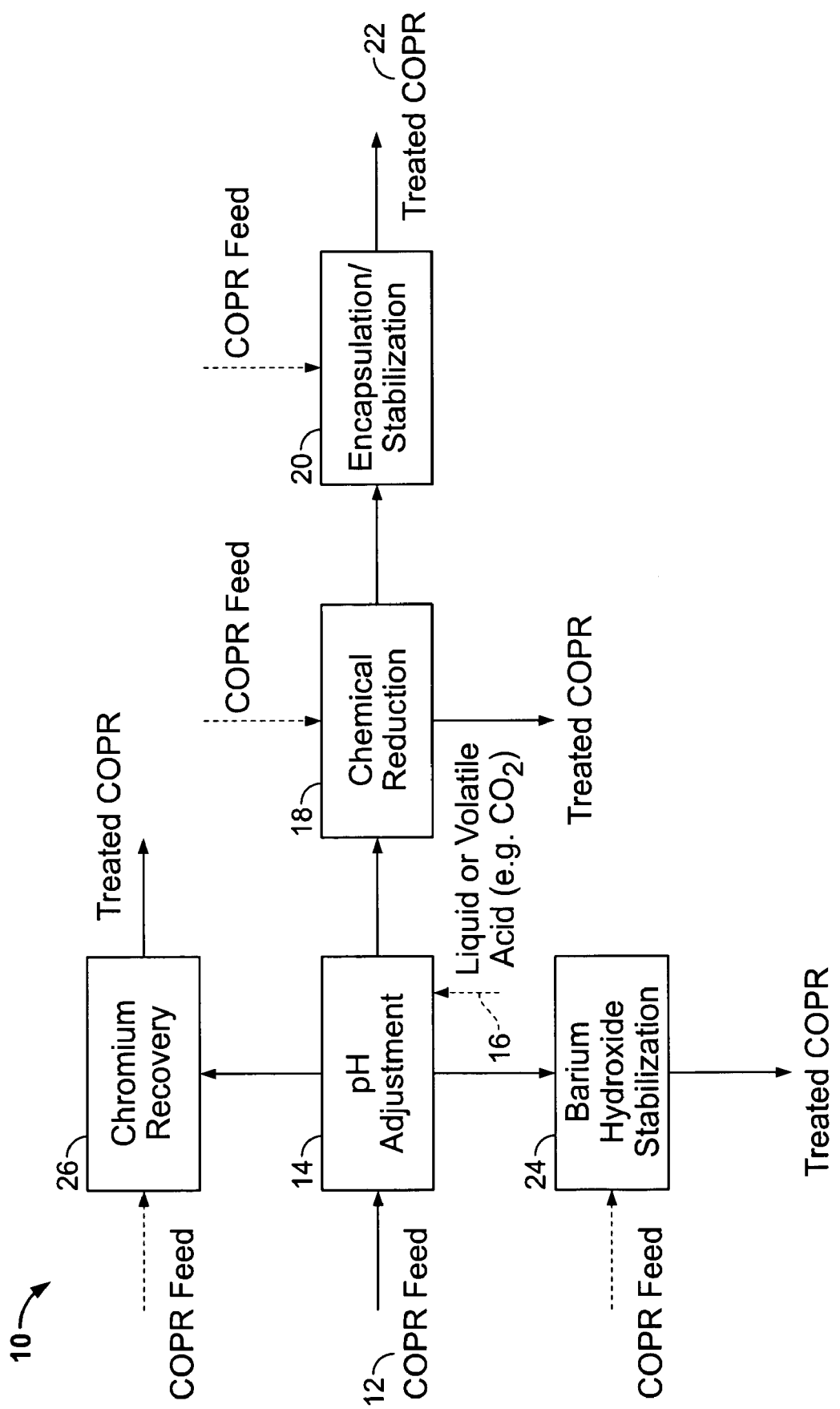
FIG. 1 is a process flow sheet for preferred methods of treating chromium-contaminated solid wastes according to the present invention.

FIG. 1 is a process flow chart 10 showing combinations of processes that, in the present invention, may be used to stabilize COPR or chromium-contaminated soil so as to produce leachates having chromium concentrations below the EPA target levels for in situ treatment or disposal in non-hazardous (Subtitle D) landfills. In a preferred combination of processes, according to the present invention, a COPR feed 12 is: (1) treated with an acid at 14, 16, thereby releasing hexavalent chromium from the COPR matrix and consuming excess alkalinity; (2) treated by chemical reduction at 18 to reduce hexavalent chromium to trivalent chromium; and (3) encapsulated at 20 to prevent leaching of any hexavalent chromium that may remain in the COPR matrix 22. It should be noted that the order of application and amounts of chemical agents used are important to both the rate of reaction and permanency of the treatment process, and are likely to be specific to the COPR or soil undergoing treatment. The disclosures made herein are directed primarily to the treatment of COPR, as such treatment presents particular challenges which are best met by the present invention. A person having ordinary skill in the relevant art will recognize the applicability of the methods and procedures disclosed herein to the stabilization of chromium-contaminated soils.

Figure 2:
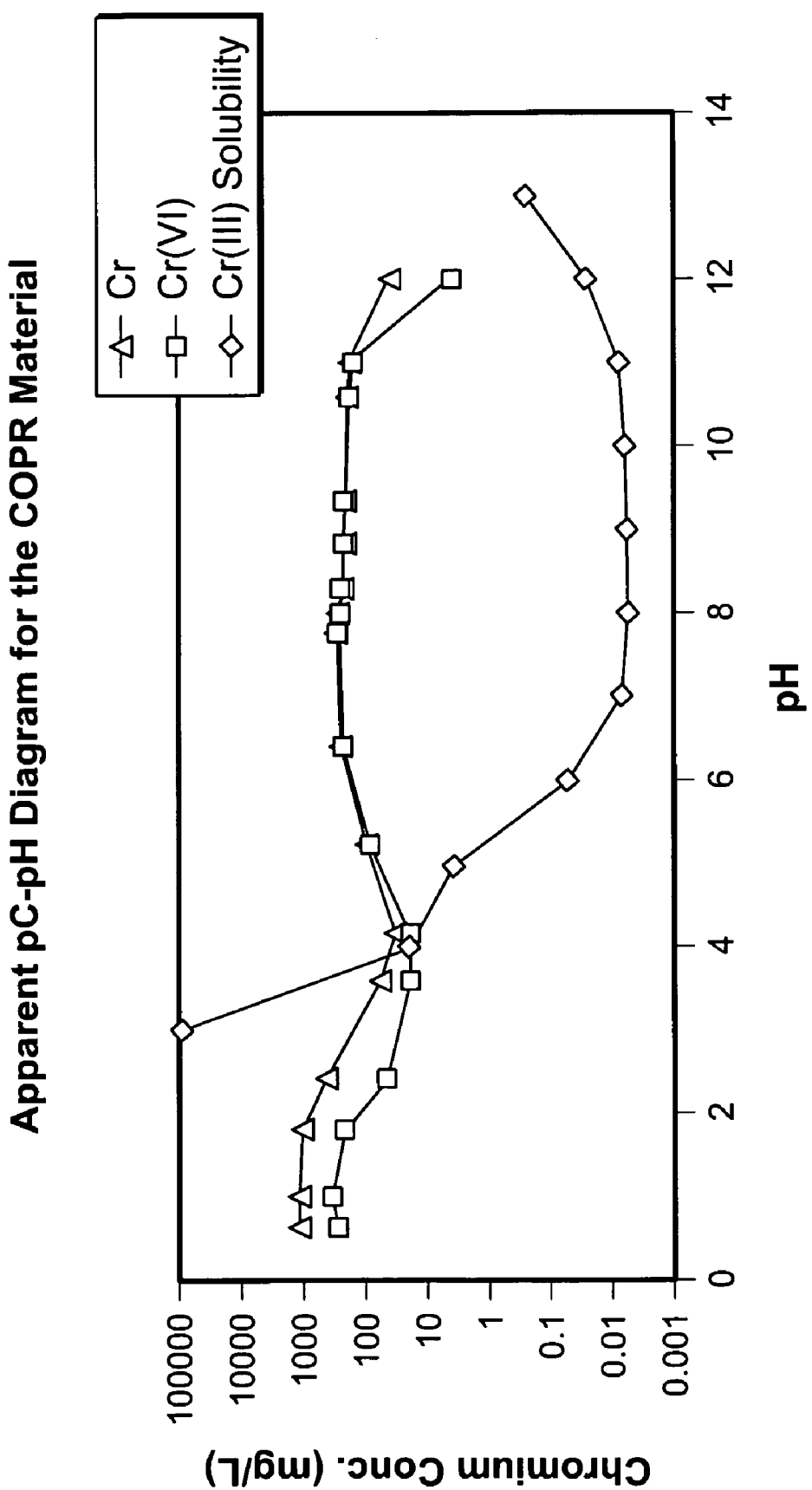
FIG. 2 is a graph illustrating relationships between concentrations of total chromium, Cr(VI), and Cr(III), and pH for a COPR.

Typically, the COPR feed 12 will be highly alkaline, and will require pH adjustment at 14, by introduction of an acid at 16 to release the chromium species from the various minerals in the COPR, and to facilitate subsequent treatment processes, such as chemical reduction at 18. As disclosed in the Examples, which are discussed further hereinbelow, the optimum conditions for the extraction and chemical reduction of hexavalent chromium appear to occur at pH values of less than 10 (see Examples 1 through 4). It also appears that maintaining a pH of less than 10 destabilizes the minerals that cause the COPR matrix to swell or prevents their formation (see Example 9). Further, adjustment of the pH of the mineral matrix chromium-enriched solutions decreases the solubility of trivalent chromium (see FIG. 2), which is also a desirable effect.

To control the pH of a process at a desired level, it is necessary to first consume the excess alkalinity in the COPR. While not being bound to any particular theory of the mechanism involved in the release of chemical species into leachate, it appears that a COPR matrix is composed mainly of two classes of minerals: those that dissolve quickly and those that dissolve slowly. Each class contains trivalent chromium or hexavalent chromium and contributes to the alkalinity of the COPR matrix. The methods of acid application used in the prior art are effective in treating the minerals that dissolve quickly. The chief drawback of these approaches is that a considerable excess alkalinity remains in the minerals that dissolve slowly, making it difficult to control the pH of subsequent treatment steps. The rapid consumption of the excess alkalinity from the quickly-dissolving minerals can also result in estimates of acid consumption that are substantially lower than the amounts actually needed to maintain the treatment pH. Further, because of inadequate pH control, a significant amount of hexavalent chromium may remain in the slowly-dissolving minerals, which will continue to release this specie into leachate.

In the present invention, acid is applied to the COPR matrix in a manner that addresses both the quickly-dissolving and slowly-dissolving minerals (i.e., acids are applied incrementally to neutralize the entire excess alkalinity of the COPR matrix). Strong acids, such as hydrochloric acid (HCl), may be applied with the addition of water as a heat sink. As an alternative, weak acids, such as sodium bisulfate ($NaHSO_4$), may be used to control the exothermic reaction. The application of carbon dioxide ($CO_2$), to form carbonic acid ($CH_2O_3$) in water (i.e., "carbonated water"), has also proven advantageous and very effective in neutralizing the alkalinity of COPR (see Example 8). An acidity buffer, such as Fe(II), may be added to the treated COPR to address the residual alkalinity, since aqueous Fe(II) will generate protons when it is hydrolyzed or oxidized to aqueous Fe(III). It should be noted that the actual amount of acid needed to bring the COPR into the targeted pH range will differ from case to case, since COPR from different sources may differ from each other in the minerals and alkaline materials that are present in the COPR matrix. Therefore, the quantities of acid or buffer that are required to effectively treat the COPR should be determined experimentally. It should also be noted that reducing the particle size of the COPR matrix to values less than mesh 100 will increase the rate at which excess alkalinity is consumed from both the quickly-dissolving and slowly-dissolving minerals.

Referring again to FIG. 1, subsequent to pH adjustment at 16, the COPR matrix and its leachate are subjected to chemical reduction at 18 to reduce hexavalent chromium to trivalent chromium. Reduction is effected by adding chemical reducing agents, such as ferrous chloride ($FeCl_2$), ferrous sulfate ($FeSO_4$), calcium polysulfide ($CaS_x$), or sodium bisulfide (NaHS). The foregoing list of chemical reducing agents is not exclusive, as any reducing agents may be used, to the extent that such agents are effective in reducing hexavalent chromium to trivalent chromium. The use of ferrous sulfate may be particularly advantageous, since sulfate has the ability to displace hexavalent chromium from the COPR matrix into solution, where the chromium would be available for chemical reduction. Preferably, the reducing agents are added to the COPR at a pH of less than 10, to reduce the likelihood that the COPR matrix will swell after treatment, as is discussed hereinbelow. Examples 1 through 4, below, address the effectiveness of various chemical reducing agents in reducing hexavalent chromium to trivalent chromium.

A COPR that has been treated by pH adjustment at 14 and chemical reduction at 18 may be sufficiently stabilized that the total chromium within its TCLP leachate is below the target levels set by the USEPA for in situ treatment or for disposal in landfills as non-hazardous waste (see Examples 1 through 4). If not, or if additional protection against leachate formation is desired, the COPR may be encapsulated or stabilized at 20. In a typical encapsulation process, the COPR is mixed with an asphalt at a temperature that is a few degrees above the melting point of the asphalt. Water and/or polymer gelling agents may be added at appropriate concentrations to promote thorough mixing of the COPR and asphalt. Drying agents may also be added after mixing to expedite water removal. Further, chemical reducing agents may be included in the mixture to reduce hexavalent chromium that may remain in the COPR matrix after treatment.

In a stabilization process at 22 or 24, COPR may be mixed with an alkaline metal hydroxide (e.g., barium hydroxide ($Ba(OH)_2$)). Appropriate stoichiometric molar ratios of alkaline metal to hexavalent chromium may be selected to reduce leachate production and control chromium in the leachate to less than the US EPA target levels (see Example 8). The addition of an alkaline metal hydroxide to stabilize COPR against leaching will also inhibit swelling of the COPR matrix.

As an alternative to chemical reduction or encapsulation, the chromium can be separated from the COPR and recovered, thereby greatly reducing the amount of chromium that remains in the COPR. In a preferred embodiment of this method, acid at 16 is added to bring the entire mass of the COPR into solution. Oxidants may be added to transform the trivalent chromium from the COPR into hexavalent chromium. The dissolved hexavalent chromium may then be recovered at 26 from the acid liquor by any suitable means known in the art, including conventional means such as electrodialysis, adsorption, or ionic exchange, then reduced to trivalent chromium. A basic material, such as minerals comprising calcium carbonate ($CaCO_3$) (e.g., calcite or aragonite), lime, or equivalent, may then be added to the chromium-depleted liquor to reconstitute the COPR matrix. The reconstituted COPR may then be treated by chemical reduction at 18, or other processes, as needed to prevent the formation of leachates having chromium concentrations in excess of the US EPA target levels.

The swell potential of COPR may be addressed by pH adjustment at 14, including processes that dissolve and reconstitute the COPR matrix. Such pH adjustment may be made before or after the COPR is treated for hexavalent chromium. The final pH is important to control swelling of the COPR matrix because most of the minerals which cause the matrix to swell are destabilized at pH values less than 9.5. The mineral brownmillerite is one of the major constituents of the COPR matrix, and is formed during the roasting process. When in contact with water, brownmillerite hydrates to form swell-causing minerals such as ettringite, calcium-aluminum-chromate ("CAC"), and hydrogarnets. The majority of the hexavalent chromium is bound in such minerals. In a process to control swelling of the COPR matrix, the swell-causing minerals are dissolved and the alkalinity of the matrix is adjusted with calcium carbonate, in mineral form, which ensures long-term pH control between 9.4 and 8.2. The swell-causing minerals will not reconstitute themselves in the aforementioned pH range. In a similar process, the COPR is stabilized by direct contact with an alkaline hydroxide, such as barium hydroxide (see Example 8).

The heave potential of the COPR may also be reduced by adding carbonate to the COPR matrix. Ettringite is geochemically stable at high pH (i.e., pH of about 10 or higher), therefore its heave potential will remain as long as the ettringite is not chemically destabilized. The addition of $CO_2$ will destabilize ettringite by reducing the local pH. Under such conditions, the ettringite matrix will gradually transform to calcite ($CaCO_3$), gypsum ($CaSO_4$) and amorphous alumina. Because the alkalinity of the material will have been consumed by the time that the transformation has been completed, the ultimate effect of carbonation will be to produce a geochemically stable matrix that has no further heave potential.

From a geotechnical point of view, the ettringite matrix is also geotechnically stable, once the transformation from brownmillerite is complete. The transformed material responds with surface cracking in response to wet and dry cycles, but does not swell noticeably. The completion of the transformation may be expedited by the addition of sulfates to the mineral matrix. The amount of sulfate must be sufficient to exhaust all sources of alumina by incorporating them into ettringite. The necessary amount of sulfate may be calculated from analyses of the total metal content of the mineral matrix. From an environmental standpoint, the use of gypsum would be favored. Reductants could also be added to the mineral matrix, before, after, or concurrently with the gypsum, to reduce the potential for formation of chromium leachates while geotechnically stabilizing the mineral matrix. The addition of carbonate may not be advantageous when attempting to stabilize a mineral matrix by adding sulfate, since the carbonate can promote geochemical reactions that destabilize and transform the ettringite, as discussed in the preceding paragraph.

All of the processes discussed herein may be performed either in situ or ex situ, except for dissolution of the COPR matrix and subsequent recovery of chromium, which are, inherently, ex situ processes. The ex situ applications of the processes discussed above can be carried out in the types of equipment that are commonly in use to reduce the particle size of an ore, or to recover metals from an ore, and in equipment that is known in the construction industry for mixing and handling finely divided materials. For example, in the hot asphalt encapsulation process at 20, the COPR, asphalt, and other components of the encapsulating mixture can be mixed in batches in the same type of equipment used to blend road-paving mixtures, or continuously by equipment that utilizes tangential or fully-intermeshing screws. For in situ applications, reagents and encapsulation or stabilization materials can be mixed in place using equipment such as backhoes, screw-type augers, or by direct injection of reagents into the volume that is to be treated. Combinations of encapsulating materials and processing equipment may be tailored specifically to the properties of the COPR material, its distribution at a site, and the local geology and infrastructure present at the site.

Figure 3:
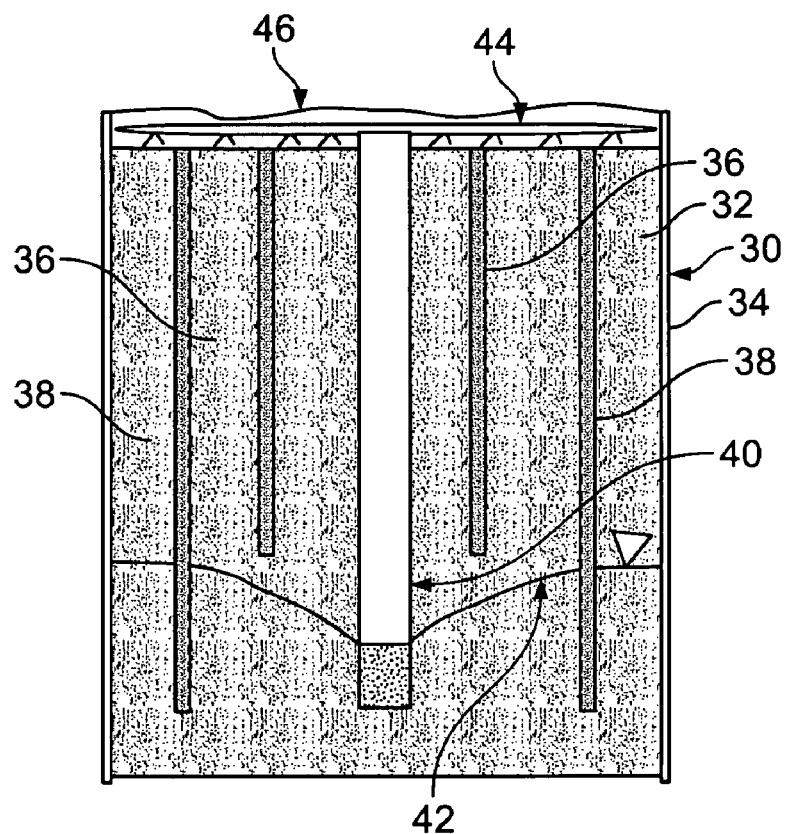
FIG. 3 is a side elevational view of a test cell for an in situ process using carbon dioxide for the remediation of COPR or chromium-contaminated soil.
Figure 4:
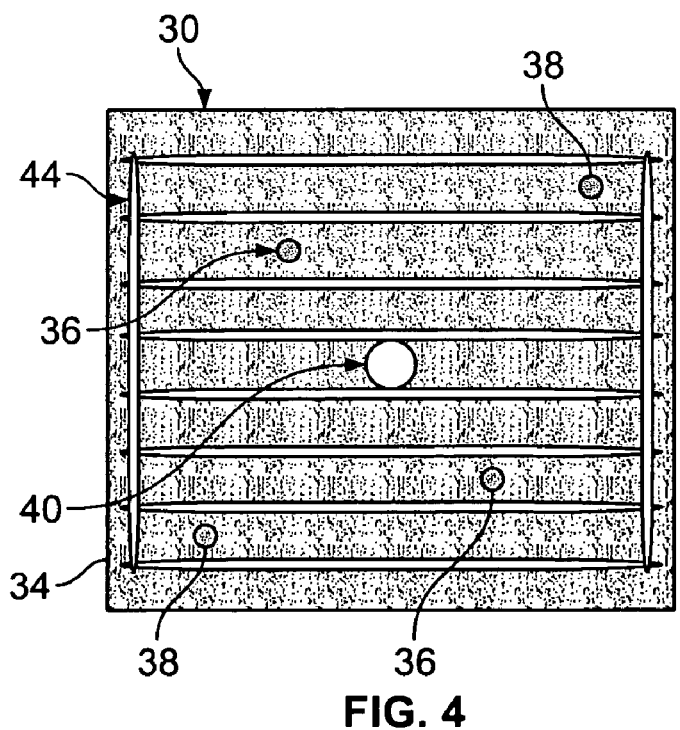
FIG. 4 is a plan view of the test cell of FIG. 3.

FIGS. 3 and 4 illustrate an example of a treatment cell 30 for in situ remediation of a column 32 of COPR or soil. The column 32 preferably is isolated from adjoining materials by a vertical barrier 34, although the presence of such a barrier is not necessary to successful remediation of the column 32. Injection wells 36, 38 are used to inject carbon dioxide, acid and/or reducing agents directly into the unsaturated zone of column 32, as do wells 36, or into the saturated zone, as do wells 38. A pumping well 40 captures the ground water from within the column 32, by drawing down the ground water table 42, and recirculates it to a surface discharge distribution system 44, with or without intervening treatment, by which it is recharged to the column 32. In applications where carbon dioxide is injected into the column 32, vacuum can be applied to selected wells 36 in the unsaturated zone, to control the flow of the carbon dioxide gas. A liner or cover 46 is placed over the treatment cell 30 to contain any spray from the surface recharge distribution system 44 and prevent the infiltration of rain water or other unwanted precipitation. The hexavalent chromium that is extracted from the column 32 may be treated in situ, by addition of chemical reducing agents to the recirculating ground water, or ex situ in a pump-and-treat configuration.

EXPERIMENTAL EXAMPLES

The following examples are intended to aid in the understanding of the methods of the present invention and are not intended to limit the scope or spirit of the invention in any way. In the following discussion, the materials, methods and experimental procedures underlying the examples are presented and discussed below, followed by the examples themselves.

I. Chromite Ore Processing Residue (COPR) Samples

The samples of COPR used in the treatability experiments discussed herein were collected from a site in Jersey City, N.J., in a bulk-sampling event. A total of fourteen samples were collected, ranging from 16.78 kg to 21.08 kg. After collection, the samples were packed in 5-gallon pails and were stored at a moderately cold temperature. The sample containers were tightly sealed to maintain the original water content of the samples. Each sample was thoroughly homogenized, then split into two halves, one of which was used to make composite samples. Each composite was made by mixing equal parts of all samples collected in the same zone (e.g., unsaturated or saturated zones) as determined from test borings. Two composite samples were used in the treatability tests described herein: (1) Composite B1B2, made of equal parts of material collected from uppermost unsaturated zone and material collected from a zone of groundwater fluctuations, which was between the uppermost unsaturated zone and the saturated zone; and (2) Composite C, representing the fully saturated material. The characteristic values of Composite B1B2, before testing, were (1) a pH of 12.5; (2) a total chromium content of 20,502 mg/Kg; (3) a total chromate (i.e., Cr(VI)) concentration of 5,188 mg/Kg; and (4) a TCLP leachate chromium concentration of 179.08 mg/L. The characteristic values of Composite C, before testing, were (1) a pH of 12.5; (2) a total chromium content of 22,270 mg/Kg; (3) a total chromate (i.e., Cr(VI)) concentration of 8,413 mg/Kg; and (4) a TCLP leachate chromium concentration of 18.89 mg/L.

II. Reagents

All stock solutions were prepared using ACS or higher-grade reagents and deionized (DI) water. Ferrous sulfate ($FeSO_4 7H_2O$) and high purity pyrite (i.e., iron sulfide ($FeS_2$)) 99.9% metals basis, were obtained from Alfa Aesar (MA, USA). Commercial grade pyrite was obtained from American Minerals Inc. (NJ, USA). Elemental iron powder (Fe(0)), at 80 and 120 mesh, was obtained from U.S. Metals Inc. (IN, USA). Calcium polysulfide solution, 29% $CaS_5$, was donated by Best Sulfur Products (CA, USA). Sodium sulfhydrate ($NaSH2.71H_2O$), sodium dithionite ($Na_2S_2O_4$), and all reagents and acids used for measurements and analysis were of ACS grade, and were obtained from Fisher Scientific (PA, USA).

III. Analytical Methods

A. Measurement of Total Chromium

The concentration of total chromium in the COPR samples was determined by digesting the COPR material using EPA Method 3051A (Microwave Assisted Acid Digestion of Sediments, Sludges, Soils, and Oils). Chromium concentrations were measured using a Varian Inductively Coupled Plasma-Optical Emission Spectroscopy (ICP-OES) instrument, and reported in units of mg/Kg based on dry solid weight of the COPR.

B. Measurement of Hexavalent Chromium

The concentration of hexavalent chromium (hereinafter, "Cr(VI)") in the COPR samples was determined using the EPA Method 3060A (Alkaline Digestion For Hexavalent Chromium). The concentration of the dissolved Cr(VI) was measured using a standard calorimetric method (EPA Method 7196A). Turbidity blanks were incorporated into the analyses procedures.

C. Toxicity Characteristic Leaching Procedure (TCLP)

The TCLP test (USEPA Method 1311, Test Methods for Evaluating Solid Waste, Physical/Chemical Methods, EPA Publication SW-486) is used to determine the leaching of contaminants under severe field conditions. Although small amounts of sample were tested, the liquid-to-solid ratios were maintained at the prescribed value of 20 L/Kg. Samples containing free liquid were processed as described in the protocol.

D. Acid Neutralizing Capacity

The Acid Neutralizing Capacity (ANC) tests were based on a document prepared by Environment Canada. A representative 1 g portion of a pulverized air-dried sample was added to a 50-mL plastic centrifuge tube. A 20 mL aliquot of DI water was added to the sample. Incremental amounts of concentrated hydrochloric acid (hereinafter "HCl") were added to the centrifuge tubes to cover a potentially wide range of final pH values. The mixtures were agitated by an end-over-end mixer for at least twenty-four hours, to reach equilibrium, before the pH values of the mixtures were recorded. Concentrations of total chromium and Cr(VI) were plotted on a logarithmic scale against the measured pH values (see FIG. 2).

IV. Experimental Procedures for Examples 1 Through 4

Representative samples of air-dried COPR, of 100 gm each, were introduced into a 250-mL plastic bottle. Water, or diluted HCl, was added to the COPR samples to reach a liquid-to-solid ratio of one, followed by the addition of a chemical containing one or more reductants. For samples in which the pH was controlled, the amount of HCl needed to produce the designated pH values was calculated from ANC data. In other samples, DI water was added, without acid, allowing the pH of the test mixture to drift freely throughout the test. Chemical reductants were added to each sample at a stoichiometric ratio of reductant to Cr(VI) that was based on the number of electrons transferred during the oxidation-reduction reactions. In cases where a reductant could reach more than one oxidation state, the stoichiometric ratios were calculated for the end-point having the lower oxidation state. For example, it was assumed that sulfide (S(-II)) would be oxidized to elemental sulfur S(0), rather than to hexavalent sulfur (S(VI)). When more than one reductant were present in a chemical (i.e., the Fe(II) and 2 S(-I) in $FeS_2$), both of the reductants were assumed to contribute to the reduction of Cr(VI). The selected dosage levels were multiples (i.e., 0.5X, 1X, 2X or 4X) of the stoichiometric amount of reductant needed to reduce the entire amount of Cr(VI) (X) present in the sample. Portions of the treated COPR were withdrawn from the plastic bottles at set time intervals and analyzed for total Cr(VI) and the total concentration of leachable chromium (hereinafter "TCLP Cr") as determined under the TCLP protocol. Values of TCLP Cr in Examples 1 through 4 should be compared to the USEPA target levels of 5 mg/L for in situ treatment and 0.6 mg/L for disposal in RCRA non-hazardous (Subtitle D) landfills.

EXAMPLE 1

Parametric Investigation of COPR Stabilization by Chemical Reductants in the Unsaturated Zone (Composite B1B2)

Example 1 illustrates the effectiveness of various chemical reagents in reducing TCLP Cr from COPR samples collected from the unsaturated zone. The parametric study investigated the effects of reagent type, stoichiometric molar ratio of reductant to Cr(VI), and treatment pH. The reductants used were elemental iron (Fe(0)), ferrous sulfate (Fe(II)), pyrite ($FeS_2$), calcium polysulfide ($Ca(S_x)$), sodium bisulfide (NaSH), and sodium dithionite ($Na_2S_2O_4$). The target pH for each test was either set to 9 or allowed to drift freely ("N") throughout the test. The ratios of reductant to Cr(VI) were set to the following multiples of the stoichiometric ratio (X) of reductant to Cr(VI): 2X and 4X. Portions of each test sample were collected at intervals up to 120 days from the start of the test and analyzed for TCLP Cr. The initial TCLP Cr concentration, for the untreated COPR sample, was 179.08 mg/L and the initial pH was 12.5. The results of each test are shown in Table 1.

TABLE 1

TCLP Chromium in Samples of Unsaturated Zone COPR Treated with Chemical Reductants.

| | | Curing period (days) | | | | | |
|---|---|---|---|---|---|---|---|
| Test Number | Test Condition | 1 TCLP Cr (mg/L) | 7 TCLP Cr (mg/L) | 21 TCLP Cr (mg/L) | 35 TCLP Cr (mg/L) | 60 TCLP Cr (mg/L) | 120 TCLP Cr (mg/L) |
| 1 | Fe(0)[N, 2×] | 101.46 | 95.42 | 115.37 | 89.12 | 92.94 | 108.33 |
| 2 | FeSO4[N, 4×] | 8.13 | 3.20 | 0.71 | 0.72 | 0.84 | 0.47 |
| 3 | A. Pyrite[9, 2×] | 144.98 | 128.27 | 117.38 | 108.04 | 96.16 | 84.63 |
| 4 | C. Pyrite[9, 4×] | 117.23 | 114.56 | 143.63 | 104.09 | 85.19 | 79.56 |
| 5 | CaSx I[9, 4×] | 0.24 | 74.48 | 52.37 | 35.15 | 0.05 | 23.36 |
| 6 | CaSx II[9, 2×] | 7.20 | 24.06 | 1.34 | 20.38 | 1.09 | 19.79 |
| 7 | NaSH[N, 4×] | 0.65 | 0.32 | 0.21 | 0.56 | 5.17 | 10.46 |
| 8 | Na2S2O4[N, 2×] | 120.24 | 113.81 | 112.98 | 114.23 | 88.04 | 76.27 |

As can be seen from the TCLP results in Table 1, ferrous sulfate, calcium polysulfide and sodium bisulfide were most effective in reducing the concentrations of chromium in the TCLP leachate from COPR samples collected in the unsaturated zone.

EXAMPLE 2

Parametric Investigation of COPR Stabilization by Chemical Reductants in the Saturated Zone (Composite C)

Example 2 illustrates the effectiveness of various chemical reagents in reducing the total concentration of leachable chromium, as determined under the TCLP protocol, for COPR samples collected from the saturated zone. The parametric study was performed according to the same procedures as were used in the study described in Example 1. The initial TCLP Cr concentration, for the untreated COPR sample, was 18.89 mg/L and the initial pH was 12.5. The results of each test are shown in Table 2.

TABLE 2

TCLP Chromium in Samples of Saturated Zone COPR Treated with Chemical Reductants.

| | | Curing period (days) | | | | | |
|---|---|---|---|---|---|---|---|
| | | 1 | 7 | 21 | 35 | 60 | 120 |
| Test Number | Test Condition | TCLP Cr (mg/L) | TCLP Cr (mg/L) | TCLP Cr (mg/L) | TCLP Cr (mg/L) | TCLP Cr (mg/L) | TCLP Cr (mg/L) |
| 1 | Fe(0)[9, 4×] | 151.47 | 134.13 | 134.99 | 130.71 | 119.44 | 107.08 |
| 2 | FeSO4[9, 2×] | 1.19 | 1.59 | 0.44 | 0.62 | 0.31 | 0.13 |
| 3 | A. Pyrite[N, 4×] | 91.98 | 104.84 | 93.84 | 99.42 | 106.46 | 62.62 |
| 4 | C. Pyrite[N, 2×] | 34.76 | 80.93 | 96.38 | 103.89 | 108.29 | 104.24 |
| 5 | CaSx I[N, 2×] | 9.99 | 5.39 | 0.64 | 0.02 | 0.05 | 1.01 |
| 6 | CaSx II[N, 4×] | 0.01 | 0.20 | 0.07 | 0.01 | 0.06 | 7.01 |
| 7 | NaSH[9, 2×] | 12.26 | 3.75 | 6.85 | 5.01 | 4.96 | 2.52 |
| 8 | Na2S2O4[9, 4×] | 33.50 | 45.50 | 62.29 | 45.98 | 26.96 | 31.53 |

As can be seen from the TCLP results in Table 2, ferrous sulfate, calcium polysulfide and sodium bisulfide were most effective in reducing the concentrations of chromium in the TCLP leachate from COPR samples collected in the saturated zone.

EXAMPLE 3

Low Reagent Dosage Effects on the Stabilization of the Unsaturated Zone (Composite B1B2)

Example 3 illustrates the effectiveness of treating COPR samples collected from the unsaturated zone using lower concentrations of reagents than were tested in Example 1. The reagents tested in the present Example (i.e., $FeSO_4$, $CaS_x$, and NaSH) were selected because of their effectiveness in reducing Cr levels in TCLP leachate in Example 1. The treatment target pH for the present Example was either set to 9.5 or allowed to drift freely ("N") throughout the test. The ratios of reductant to Cr(VI) were set to the following multiples of the stoichiometric ratio (X) of reductant to Cr(VI): 0.5X, 1X, and 1.5X. Samples were collected for analysis of Cr(VI) in the treated COPR and TCLP Cr at intervals of 7, 30 and 80 days. The initial concentration of Cr(VI) in the COPR was 5,188 mg/Kg, the initial concentration of TCLP Cr was 179.08 mg/L, and the initial pH of the COPR sample was 12.5. The results of each test are shown in Table 3.

TABLE 3

Hexavalent Chromium and TCLP Chromium in Samples of Unsaturated Zone COPR Treated with Low Dosages of Chemical Reductants.

| | | Curing Period (days) | | | | | |
|---|---|---|---|---|---|---|---|
| | | 7 | 30 | 80 | 7 | 30 | 80 |
| Test No. | Test Condition | Cr(VI) (mg/Kg) | Cr(VI) (mg/Kg) | Cr(VI) (mg/Kg) | TCLP Cr mg/L | TCLP Cr mg/L | TCLP Cr mg/L |
| 1 | FeSO4[9.5, 1.5×] | 534.71 | 610.29 | 774.84 | 2.63 | 1.53 | 1.51 |
| 2 | FeSO4[N, 1.5×] | 1268.32 | 752.25 | 813.62 | 14.63 | 16.34 | 22.32 |
| 3 | FeSO4[N, 1×] | 1153.41 | 1084.22 | 1026.77 | 27.49 | 27.78 | 28.22 |
| 4 | FeSO4[9.5, 1×] | 1642.07 | 1610.22 | 1634.55 | 18.51 | 21.10 | 26.95 |
| 5 | CaSx[N, 1×] | 43.25 | 22.62 | 44.49 | 16.65 | 11.35 | 8.07 |
| 6 | CaSx[N, 0.5×] | 193.55 | 880.51 | 425.85 | 13.99 | 11.21 | 10.19 |
| 7 | NaHS[9.5, 1×] | 326.97 | 262.42 | 196.85 | 7.22 | 7.16 | 5.38 |
| 8 | NaHS[N, 1×] | 560.27 | 1058.77 | 956.53 | 14.25 | 14.31 | 13.73 |
| 9 | NaHS[N, 0.5×] | 1664.75 | 796.65 | 1091.04 | 21.84 | 13.47 | 15.12 |
| 10 | NaHS[9.5, 0.5×] | 2539.83 | 2296.79 | 2391.05 | 46.19 | 36.31 | 38.75 |

EXAMPLE 4

Low Reagent Dosage Effects on the Stabilization of the Saturated Zone (Composite C)

Example 4 illustrates the effectiveness of treating COPR samples collected from the saturated zone using lower concentrations of reagents than were tested in Example 2. The experimental procedures used in the present Example were the same as those used in Example 3. The initial concentration of Cr(VI) in the COPR was 8,413 mg/Kg, the initial concentration of TCLP Cr was 18.89 g/L, and the initial pH of the COPR sample was 12.5. The results of each test are shown in Table 4.

TABLE 4

Hexavalent Chromium and TCLP Chromium in Samples of Saturated Zone COPR Treated with Low Dosages of Chemical Reductants.

| | | Curing Period (days) | | | | | |
|---|---|---|---|---|---|---|---|
| Test No. | Test Condition | 7 Cr(VI) (mg/Kg) | 30 Cr(VI) (mg/Kg) | 80 Cr(VI) (mg/Kg) | 7 TCLP Cr mg/L | 30 TCLP Cr mg/L | 80 TCLP Cr mg/L |
| 1 | FeSO4[N, 1.5×] | 1247.92 | 707.83 | 1195.31 | 7.42 | 5.18 | 6.53 |
| 2 | FeSO4[9.5, 1×] | 1804.37 | 2487.16 | 1709.89 | 17.39 | 10.53 | 18.13 |
| 3 | FeSO4[9.5, 1.5×] | 121.28 | 603.78 | 655.84 | 9.84 | 5.03 | 7.14 |
| 4 | FeSO4[N, 1×] | 2150.14 | 2317.01 | 1982.62 | 20.89 | 16.46 | 15.10 |
| 5 | CaSx[N, 1×] | 128.05 | 31.96 | 70.98 | 9.91 | 5.11 | 3.70 |
| 6 | CaSx[N, 0.5×] | 175.06 | 508.69 | 173.35 | 4.80 | 3.31 | 2.49 |
| 7 | NaHS[N, 1×] | 1082.38 | 730.06 | 1347.71 | 3.27 | 2.34 | 3.28 |
| 8 | NaHS[9.5, 0.5×] | 2121.41 | 1589.68 | 1394.51 | 35.23 | 29.57 | 32.07 |
| 9 | NaHS[9.5, 1×] | 267.13 | 431.61 | 775.31 | 4.36 | 3.96 | 4.05 |
| 10 | NaHS[N, 0.5×] | 2758.81 | 2462.66 | 2273.74 | 6.23 | 2.39 | 2.58 |

EXAMPLE 5

Leaching Behavior of COPR

The leaching behavior of COPR was investigated by conducting leaching batch tests. Representative portions of pulverized air-dried COPR (Composite B1B2) were mixed with water to produce a liquid-to-solid ratio of 20 L/Kg. Incremental amounts of concentrated hydrochloric acid (HCl) were added to the COPR samples to cover a potentially wide range of final pH values. The mixtures were agitated by an end-over-end mixer for at least 1 week, to reach equilibrium, at which time, the pH values of the mixtures were recorded. A portion of the leachate from each sample was analyzed for total chromium and Cr (VI). The initial centration of chromium in the COPR sample was 20,502 mg/Kg, the initial Cr(VI) concentration was 5,188 mg/Kg, and the initial pH was 12.5. The results of the tests are shown in Table 5.

TABLE 5

Results of Leaching Tests Performed on COPR Samples Collected from the Unsaturated Zone

| Test No. | eq (H+)/kg | pH | Cr mg/l | Cr(VI) mg/l |
|---|---|---|---|---|
| 1 | 0.00 | 11.93 | 4.00 | 3.56 |
| 2 | 1.27 | 11.17 | 163.53 | 153.40 |
| 3 | 2.53 | 10.67 | 216.25 | 205.00 |
| 4 | 4.11 | 9.50 | 202.01 | 191.70 |
| 5 | 5.69 | 9.15 | 257.00 | 233.90 |
| 6 | 7.27 | 8.79 | 289.68 | 266.50 |
| 7 | 8.86 | 8.03 | 285.55 | 262.30 |
| 8 | 10.44 | 7.92 | 315.66 | 287.60 |
| 9 | 11.39 | 6.89 | 318.91 | 257.90 |
| 10 | 15.18 | 5.86 | 201.29 | 164.50 |
| 11 | 18.98 | 4.44 | 28.33 | 23.70 |

TABLE 5-continued

Results of Leaching Tests Performed on COPR Samples Collected from the Unsaturated Zone

| Test No. | eq (H+)/kg | pH | Cr mg/l | Cr(VI) mg/l |
|---|---|---|---|---|
| 12 | 22.77 | 3.81 | 39.63 | 17.30 |
| 13 | 26.57 | 3.07 | 125.59 | 35.30 |
| 14 | 30.36 | 1.88 | 715.89 | 177.90 |
| 15 | 34.16 | 1.36 | 1071.10 | 306.30 |
| 16 | 37.96 | 0.67 | 1040.20 | 271.90 |

The results shown in Table 5 indicate that most of the total chromium was released when approximately thirty-four equivalents of acid ($H^+$) were added per one kilogram of COPR (see Test 15). The total amount released from the calculated as the leachate concentration multiplied by the liquid-to solid ratio of 20 L/Kg, which, in Test 15, results in a total amount of 21,422 gm Cr/Kg COPR, which constitutes the entire chromium content of the COPR, within experimental error. With regard to leachate, most of the Cr(VI) was leached out of the COPR at a pH of approximately 9 (see Test 5). By the same calculation method used for Test 15, the leachate Cr(VI) concentration of 266 mg/L, at a liquid-to-solid ratio of 20 L/Kg, is equivalent to a 5,320 mg Cr(VI)/Kg COPR, which constitutes the entire Cr(VI) content of the COPR, within experimental error.

EXAMPLE 6

Hot Asphalt Encapsulation

Hot asphalt encapsulation was investigated as a method for reducing the leachability of chromium from COPR. Portions of COPR (Composite B1B2), having an initial water content of about 33 percent, were mixed for approximately 10 minutes with either Type B1 asphalt or Type B9 asphalt, using a twin screw extruder. Because Type B1 has a softening point of 106° C. and Type B9 has a softening point of 83° C., mixing was conducted at 120° C. for Type B1 and 90° C. for Type B9. Sodium carboxymethyl cellulose ("CMC") was added to some samples to aid the mixing process. Some samples were pretreated with ferrous sulfate, prior to encapsulation, at a stoichiometric ratio of 1.5X and pH of 9.5. The Test Conditions listed in Table E6 denote the various percentages of COPR, reductants, and encapsulants used. For example, "Fe B1B2 70% B9 30% CMC 1%" means the experiment was conducted using ferrous sulfate pretreatment as described in Examples 1 through 4, and that the composition of the encapsulated sample was 70 percent COPR (Composite B1B2), 30 percent Type B9 asphalt, and 1 percent CMC. Samples were taken immediately after the end of the 10-minute mixing period for TCLP extraction and chromium analysis. The initial TCLP Cr concentration for the COPR (Composite B1B2) sample was 179.08 mg/L. The results in Table 6 indicate that encapsulation is a viable option for reduction of COPR leaching.

TABLE 6

TCLP Chromium Concentrations for COPR (Composite B1B2) After Hot Asphalt Encapsulation

| Test No. | Test Condition | TCLP Cr (mg/L) |
|---|---|---|
| 1 | B1B2 60% B1 40% | 6.77 |
| 2 | B1B2 Fe 40% B1 60% | 3.79 |
| 3 | B1B2 70% B9 30% | 11.16 |
| 4 | B1B2 70% B9 30% CMC 1% | 16.85 |
| 5 | Fe B1B2 70% B9 30% CMC1% | 3.92 |

EXAMPLE 7

Barium Hydroxide Stabilization

Barium hydroxide stabilization was investigated for its effectiveness in reducing chromium concentrations in leachate from COPR. Representative portions of COPR (Composite B1B2) were mixed with various molar stoichiometric ratios of barium to chromate (Ba/Cr(VI)). The initial water content of the sample was 25 percent, and no water was added during mixing. The treated samples were subjected to TCLP extraction immediately after mixing was completed. The initial TCLP Cr concentration for the COPR (Composite B1B2) sample was 179.08 mg/L. The treatment results in Table 7 indicate that the addition of barium hydroxide is very effective in controlling the leaching of chromium from COPR.

TABLE 7

TCLP Chromium Concentrations for COPR (Composite B1B2) After Barium Hydroxide Stabilization

| Test No. | Test Condition | TCLP Cr (mg/L) |
|---|---|---|
| 1 | Molar Ba/Cr(VI) = 0.5 | 45.88 |
| 2 | Molar Ba/Cr(VI) = 1 | 11.96 |
| 3 | Molar Ba/Cr(VI) = 5 | 0.05 |

EXAMPLE 8

Carbon Dioxide Treatment

The use of carbon dioxide ($CO_2$) was investigated for its ability to reduce the pH of COPR. Small amounts of COPR (Composite B1B2) were mixed with water in a liquid-to-solid ratio of 5 L/Kg in nine samples, which were then placed in a closed plexiglass container. The container was continually purged with carbon dioxide, and the samples continually agitated, for the entire test period. Samples were removed from the container at intervals of up to sixteen days for analysis of pH, Cr(VI) concentration in the leachate, and weight mass increase. Duplicate samples were transferred to closed tubes, after removal from the container, and monitored for pH (the "continuous mixing" pH) while being agitated by an end-over-end mixer. The initial Cr(VI) concentration of the COPR was 5,188 mg/Kg, and the initial pH was 12.5. The results in Table 8 indicate that carbon dioxide addition effectively reduces the pH of the COPR material.

TABLE 8

Leachate Cr(VI) Concentration and pH After Treatment with $CO_2$

| Sample | CO2 Curing time (days) | pH post CO2 Injection | Continuous Mixing pH | Mixing time (days) | Wt. Increase % | Leached Cr (VI) mg/Kg |
|---|---|---|---|---|---|---|
| 1 | 0.25 | 8.79 | 10.85 | 30 | 5.015 | 1921.28 |
| 2 | 0.5 | 8.4 | 10.74 | 30 | 5.73 | 2344.50 |
| 3 | 1 | 7.39 | 10.06 | 29 | 6.49 | 2413.66 |
| 4 | 2 | 7.55 | 9.23 | 28 | 8.54 | 3019.40 |
| 5 | 3 | 7.67 | 9.01 | 27 | 9.27 | 2901.25 |
| 6 | 4 | 7.76 | 8.85 | 26 | 9.40 | 3313.44 |
| 7 | 5 | 7.77 | 8.87 | 25 | 10.93 | 3384.96 |
| 8 | 6 | 7.77 | — | 24 | 11.45 | 3408.00 |
| 9 | 16 | 7.83 | 8.76 | 16 | 11.23 | 3684.00 |

EXAMPLE 9

Change in Mineralogy upon Treatment

Figure 5:
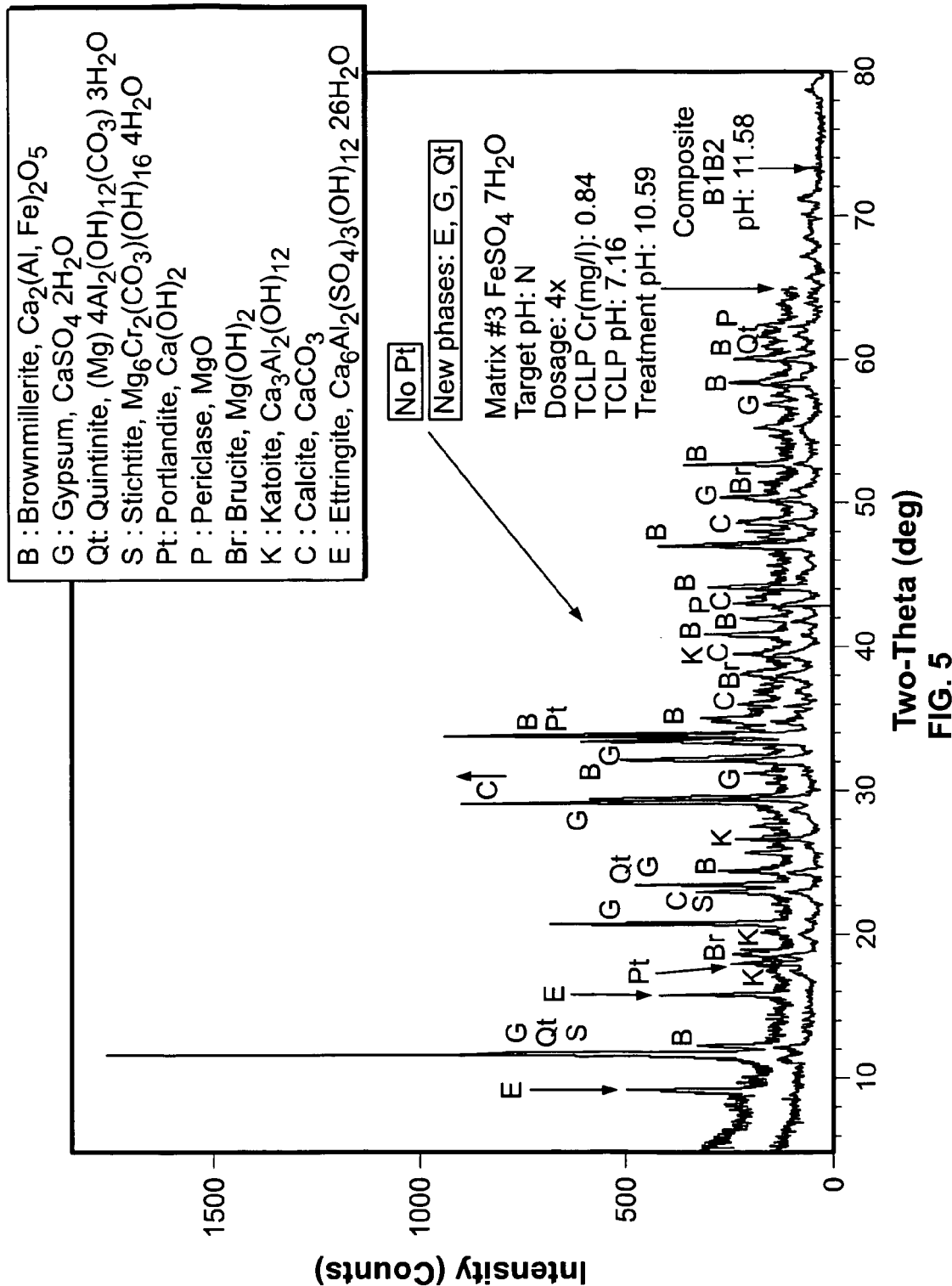
FIG. 5 is an X-ray powder diffraction spectrum of a COPR at a pH of 10.59.
Figure 6:
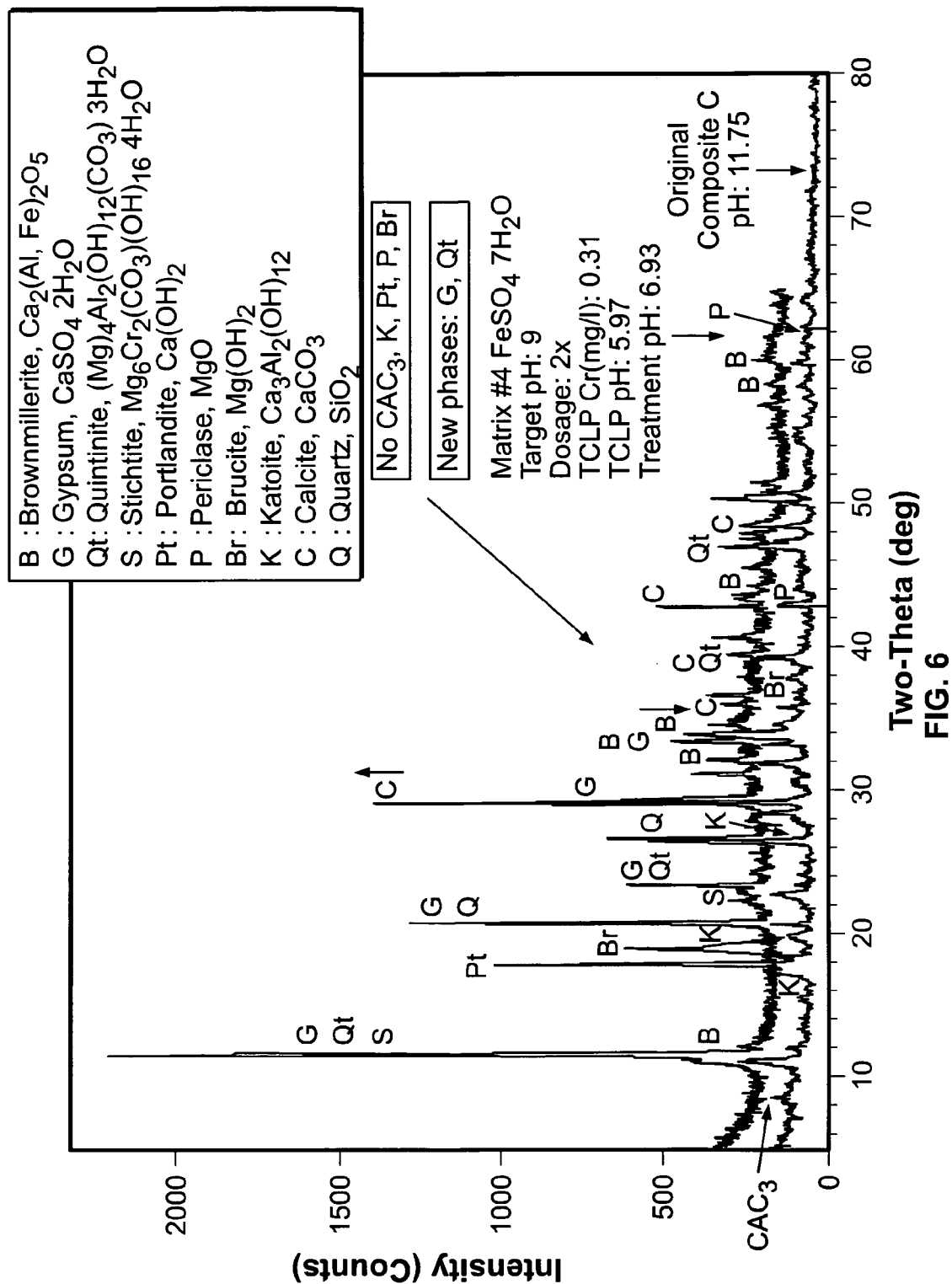
FIG. 6 is an X-ray powder diffraction spectrum of a COPR at a pH of 6.93.

Treating COPR with ferrous sulfate or sulfide compounds introduces sulfate into the COPR matrix. Such an addition may result in the formation of ettringite ($Ca_6[Al(OH)_6]_2$ $(SO4)_3.26H_2O$), which is one of the minerals that may cause the COPR matrix to swell. Controlling the pH at which the COPR matrix is treated can effectively prevent ettringite from forming. As may be seen in the X-ray powder diffraction (XRPD) spectra shown in FIGS. 5 and 6, the spectra for the untreated COPR sample (i.e., the lower spectra on each of FIGS. 5 and 6) do not exhibit the peaks characteristic of ettringite, at about 9 degrees (2θ) and about 16 degrees (2θ). However, after the addition of ferrous sulfate at a pH of 10.59, the XRPD spectrum for the treated matrix (i.e., the upper spectrum of FIG. 5) indicated that ettringite had formed. After the addition of ferrous sulfate at a pH of 6.93, the XPRD spectrum for the treated matrix (i.e., the upper spectrum of FIG. 6) did not show the characteristic peaks of ettringite. The XRPD spectra exhibited in FIGS. 5 and 6 were produced by analyzing the treated samples of Test 2 of Table 1 and Test 2 of Table 2, respectively.

EXAMPLE 10

Addition of Sulfates and Reductants to Control Heave and Reduce Chromate in COPR Matrices A pilot test was conducted to examine the effectiveness of various chemical treatments in controlling heave and reducing the leachability of chromate in COPR matrices. The pilot included both ex situ and in situ tests. For the ex situ tests, samples of COPR were mixed with ferrous sulfate, calcium polysulfide or ferrous chloride, with or without the addition of acid. Various stoichiometric amounts of the chemical reagents were added to the COPR samples, and the samples were mixed in a pugmill. For the in situ tests, reagents were mixed into plots of COPR using a horizontal rotary mixer or a vertical auger. The pilot tests showed that the addition of sulfate drastically changed the dissolution kinetics of brownmillerite, causing the dissolution of up to 75 percent of the total amount of brownmillerite. Upon addition of ferrous sulfate, the pH of the mixture dropped by 2 to 5 units, enabling the sulfate to precipitate as gypsum. The COPR continued to dissolve, releasing alkalinity and increasing the pH to levels that favored the formation of ettringite. Ettringite was noticed at pHs of less than 9.9, which is below the pH value of 10.5 that is reported in the literature. Without being held to a particular theory, it is believed that this effect is due to the presence of a high concentration of sulfate in the mixture. The rate at which the brownmillerite transformed to ettringite, as well as the amount of ettringite that was formed, dictated the rate and magnitude of heave development observed in the treated plots. Once the transformation reactions were completed, the resulting ettringite matrix seemed to have sufficient geotechnical stability and bearing capacity to support structures.

It should be understood that the embodiments described herein are merely exemplary and that a person skilled in the art may make many variations and modifications thereto without departing from the spirit and scope of the present invention. For example, certain processes, such as chemical reduction at 18, encapsulation at 20, stabilization at 24, or chromium recovery at 26, may be carried out on a raw COPR feed, depending on the characteristics of the COPR, the target treatment levels, and the physical or economic constraints of the remediation project. The processes discussed in the present disclosure may also be combined with other processes, not named herein, to achieve particular remedial objectives. Further, other suitable pH modifiers and reductants may be used in the present invention, beyond those previously disclosed herein. These and all other variations and modifications are intended to be included within the scope of the invention as defined in the appended claims.

We claim:

1. A process for geotechnically stabilizing a mineral matrix associated with a chromite ore processing residue, the process comprising the steps of
    contacting the mineral matrix with a source of sulfate in such a quantity as to promote the swelling of the mineral matrix; and
    adjusting the pH of the mineral matrix to a final pH of about 10 or greater.

2. The process of claim 1, wherein the source of sulfate is gypsum.

3. The process of claim 1, wherein said process is performed so as to create a bearing capacity in the chromite ore processing residue that is sufficient to support structures thereupon.

4. The process of claim 1, wherein the mineral matrix contains a quantity of alumina, said process further comprising the steps of determining the quantity of alumina in the mineral matrix, and calculating the quantity of the source of sulfate that is sufficient to cause the incorporation of substantially all of the quantity of alumina into ettringite, said contacting step utilizing at least the calculated quantity of the source of sulfate to contact the mineral matrix.

5. The process of claim 1, wherein the mineral matrix has at least one alkaline component, said process further comprising the step of consuming at least a portion of the at least one alkaline component before the performance of the contacting step.

6. The process of claim 5, wherein the mineral matrix has at least two alkaline components that dissolve at different rates and said consuming step is performed so as to consume substantially all of each of the alkaline components.

7. The process of claim 1, wherein said contacting step is performed so as to maximize the swelling of the mineral matrix.

8. A process for geotechnically stabilizing a mineral matrix associated with a chromite ore processing residue, said mineral matrix comprising at least one mineral which creates in the mineral matrix a tendency to swell, said process comprising the steps of
    contacting the mineral matrix with a source of inorganic anions so as transform said at least one mineral to at least one other mineral in such a manner so as to control the tendency of the mineral matrix to swell; and
    controlling the pH of the mineral matrix so as to prevent the reformation of said at least one mineral.

9. The process of claim 8, wherein the mineral matrix has at least two alkaline components, the source of inorganic anions is a source of carbonate, and said contacting and controlling steps are performed concurrently so as to maintain the pH of the mineral matrix in the range of about 9.4 to about 8.2, said process further comprising the step of adjusting the pH of the mineral matrix to a pH of less than about 10, in such a manner as to consume substantially all of each of the alkaline components, said adjusting step being performed before said contacting step.

10. The process of claim 8, wherein the source of inorganic ions is a source of sulfate, and said contacting step is performed so as to maximize the swelling of the mineral matrix, and said controlling step includes the step of adjusting the pH of the mineral matrix to a final pH of about 10 or greater, thereby creating a bearing capacity in the chromite ore processing residue that is sufficient to support structures thereupon.

* * * * *